I. S. CLOUGH.
Combined Animal and Roach Traps.
No. 149,918. Patented April 21, 1874.
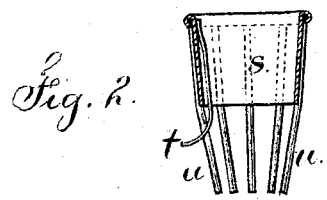
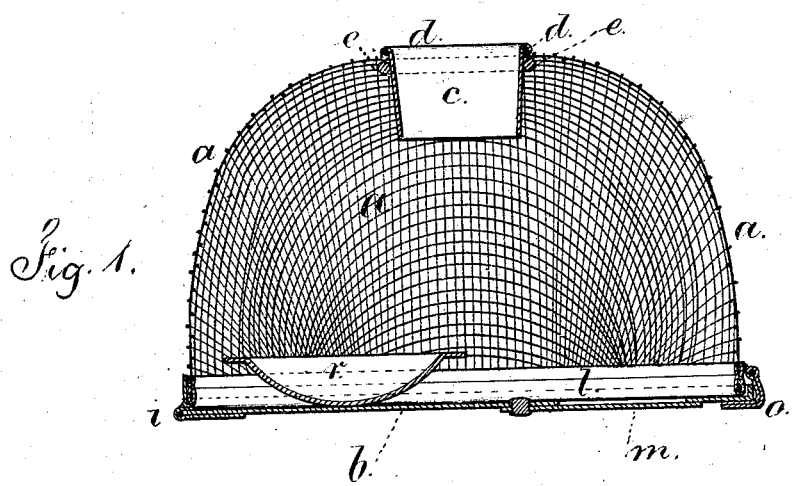
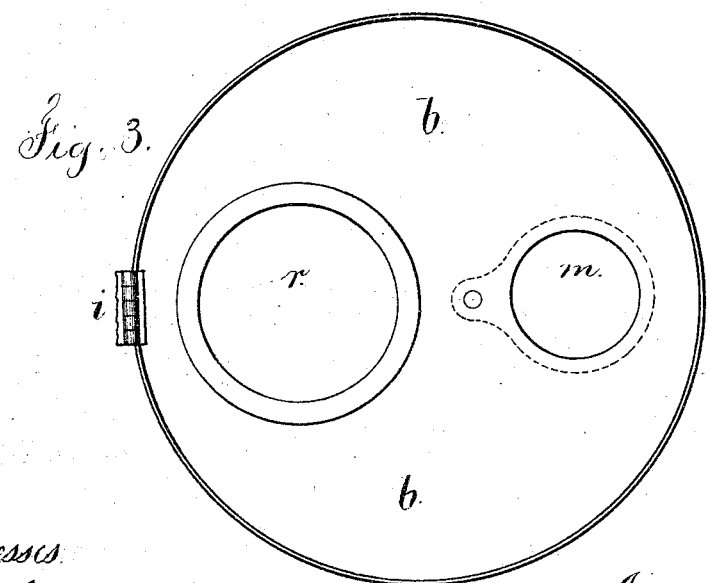
Witnesses
Chas H Smith
Geo. D. Pinckney
Inventor
Isaac S. Clough
per L. W. Serrell
atty

UNITED STATES PATENT OFFICE.

ISAAC S. CLOUGH, OF BROOKLYN, NEW YORK, ASSIGNOR TO HIMSELF AND HOWARD & MORSE, OF NEW YORK CITY.

IMPROVEMENT IN COMBINED ANIMAL AND ROACH TRAPS.

Specification forming part of Letters Patent No. 149,918, dated April 21, 1874; application filed February 24, 1874.

*To all whom it may concern:*

Be it known that I, ISAAC S. CLOUGH, of Brooklyn, in the county of Kings and State of New York, have invented an Improvement in Traps for Roaches, Mice, &c., of which the following is a specification:

This trap is adapted to catching roaches, water-bugs, and similar vermin. It may also be used for catching mice, and I provide a movable attachment especially adapted to use when the trap is intended for catching mice. I make use of a receptacle of wire-cloth with a tubular thimble at the top made of sheet metal, or similar smooth material, so that the roaches slide through the same into the trap after climbing up the outside of the cloth. The trap is provided with a bottom that can be opened for discharging the contents into water or otherwise for their destruction. The bait is introduced within the trap, preferably into a receptacle placed upon the bottom. A removable sheet-metal thimble introduced within the stationary thimble and armed with spring-guards serves to adapt the trap to catching mice.

In the drawing, Figure 1 is a vertical section of the trap. Fig. 2 is a section of the removable thimble, and Fig. 3 is a plan of a bottom that may be made use of.

The trap is made with the wire-cloth a, preferably in a dome shape, rising above the base b, and having a hole at the top, into which is introduced the smooth thimble c, preferably of sheet metal, with a flange, d, to rest upon the cloth, and with a ring, e, upon the under side surrounding the thimble, and pressed home to place so as to clamp the wire-cloth, and this ring may be secured to the thimble by solder. The bottom b is preferably of metal hinged at i to the ring l that receives the lower edges of the cloth a, and at o is a catch to hold the bottom in place, but to allow of the bottom being moved to open the trap to discharge the vermin into water or otherwise for their destruction. The bottom b might be of wood, fastened to the cloth, as shown in Fig. 3, and provided with a hole and cover or slide at m. A receptacle for bait may be provided at r. The thimble s is adapted to fit into the thimble c and be held by the spring-catch t, and the wires u serve as guards to prevent a mouse that may pass into the trap jumping out. This removable thimble will be unnecessary when the trap is used only for roaches.

I claim as my invention—

1. The trap made of wire-cloth, with a smooth flanged thimble at the top secured to the cloth by a ring passing over the thimble, and with a bottom opening to the trap, at which the vermin can be removed, as set forth.

2. In combination with the trap, constructed as aforesaid, the removable thimble s with the guard-wires, for the purposes set forth.

Signed by me this 19th day of February, A. D. 1874.

I. S. CLOUGH.

Witnesses:
GEO. T. PINCKNEY,
CHAS. H. SMITH.